No. 740,521.  
Patented October 6, 1903.

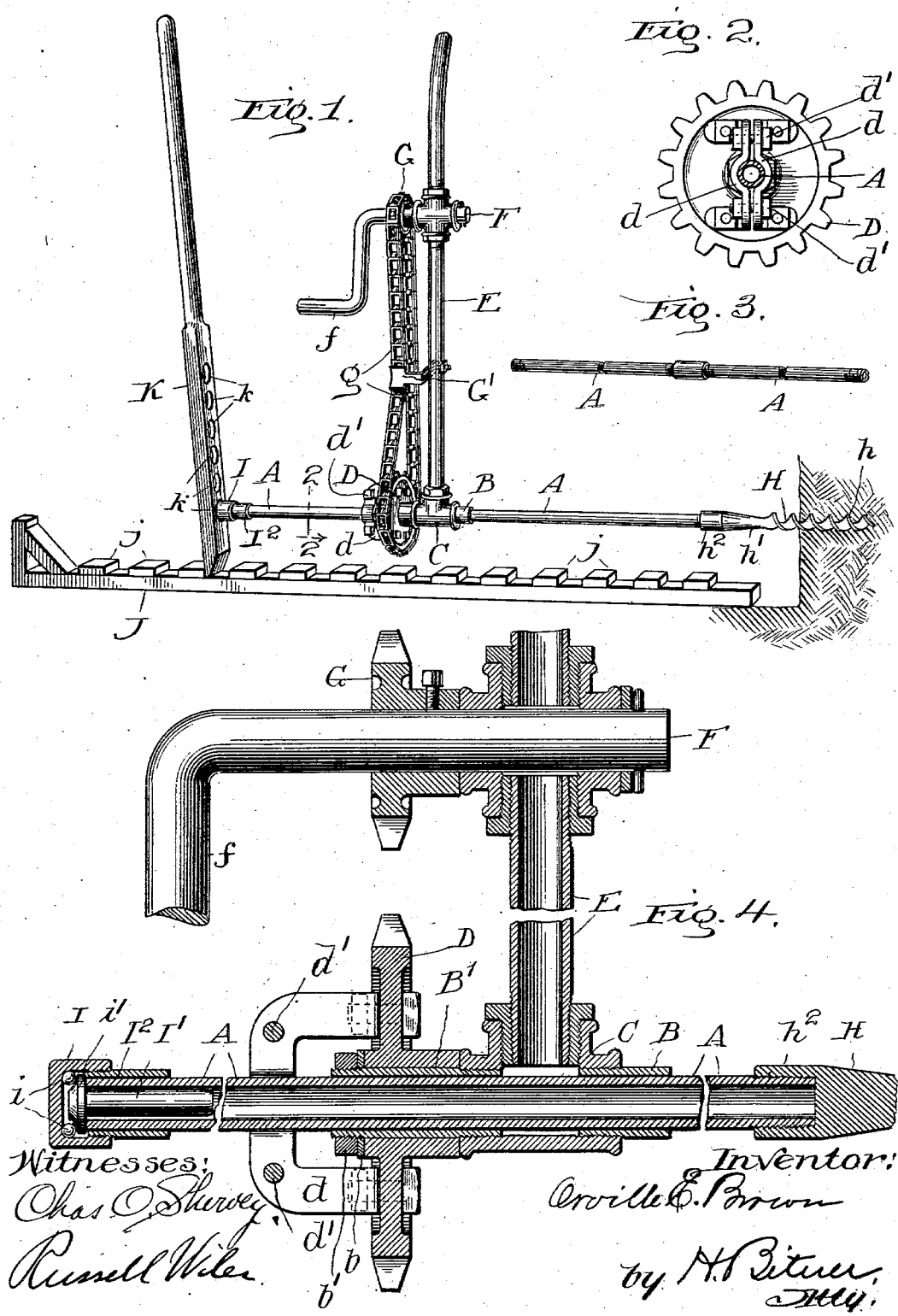

UNITED STATES PATENT OFFICE.

ORVILLE E. BROWN, OF LANARK, ILLINOIS.

MECHANISM FOR RUNNING UNDERGROUND PIPES.

SPECIFICATION forming part of Letters Patent No. 740,521, dated October 6, 1903.

Application filed March 7, 1903. Serial No. 146,617. (No model.)

*To all whom it may concern:*

Be it known that I, ORVILLE E. BROWN, a citizen of the United States of America, residing at Lanark, in the county of Carroll and State of Illinois, have invented certain new and useful Improvements in Mechanism for Running Underground Pipes, of which the following is a specification.

My invention relates to certain new and useful improvements in mechanism for running underground pipes; and its object is to produce a device by which a length of metal pipe may be laid underground without digging the usual trench for that purpose.
To this and certain minor ends my invention consists in certain novel features of construction, which are fully illustrated in the accompanying drawings and described in the specification.
In the aforesaid drawings, Figure 1 is a perspective of my improved device, showing its position in use. Fig. 2 is a section in line 2 2 of Fig. 1 looking in the direction of the arrow. Fig. 3 is a perspective view of a portion of the pipe used, and Fig. 4 is a detail vertical longitudinal central section.

Referring to the drawings, A represents a length of pipe to be laid in the earth. This pipe is passed through a suitable sleeve consisting of two portions B and B', substantially in line with each other and secured in the opposite ends of a T-coupling C. The pipe is freely rotatable and longitudinally movable within the sleeves. Upon the portion B' of the sleeve is a sprocket D, provided with two U-shaped clamping members $d$, which are adapted to surround the pipe A, to be clamped tightly together thereon by bolts $d'$. The sprocket is held in place upon the portion B' of the sleeve by a washer $b$ and a locknut $b'$ and is rotatable thereon. It is obvious that the arrangement of the parts so far described is such that the pipe A is rotatable in the sleeve through which it extends; but when the two U-shaped clamping members $d$ are brought together upon it it is non-rotatable with respect to the sprocket D. Therefore rotating the sprocket D will rotate the pipe. In the T-coupling C and extending at right angles to the pipe A is a pipe E, having in its upper end a cross-fitting through which extends at right angles to the pipe E and parallel to the pipe A a shaft F, provided at its end with a crank-handle $f$. Upon this shaft F is provided a sprocket G, connected to the sprocket D by a chain $g$. A chain-tightener G' is provided on the pipe E to take up the slack in the sprocket-chain $g$. The arrangement of these parts is obviously such that turning the crank $f$ will, through the medium of the sprockets G and D, rotate the pipe A. To that end of the pipe A which it is intended to insert in the earth an auger H is secured. This auger preferably consists of an ordinary screw-threaded portion $h$, a tapered portion $h'$, extending therefrom, and a cap $h^2$ of greater diameter than the pipe A, which cap is screwed on over the end of said pipe. An antifriction-bearing is provided for the opposite end of the pipe A. A cup I, provided with a ball-race for balls $i$, has within it a pin I', provided with a cone $i'$, running upon the balls $i$. The pin is secured in place in the cup I by a sleeve $I^2$, screwed into the cup and overhanging the cone $i'$ on the pin. This antifriction-bearing is made to coöperate with the pipe by thrusting the end of the pipe into the annular space left between the sleeve $I^2$ and the pin I'. This brings the end of the pipe A to bear upon the head $i'$, which rotates with the pipe, and the friction caused by the rotation of the pipe is therefore taken up by the balls. A rack J, preferably of wood, is provided, upon which rack are a plurality of blocks $j$, adapted to engage with the end of a lever K, provided with depressions $k$ of suitable size to receive the cup I. The rack J is placed upon the ground in such position as not to slip, as shown in Fig. 1.

The operation of the device will now be apparent. When it is desired to lay a horizontal length of pipe, a hole is made in the ground to the depth at which the pipe is to be laid and the rack J is placed in position. A short length of pipe of the right diameter is passed through the sleeve, and the auger is secured to the end which is to enter the earth. The antifriction-bearing is then placed upon the opposite end of the pipe, and one man pushes upon the lever K, so as to force the end of the auger into the earth, while another man turns the crank $f$ and rotates the pipe. As the pipe advances the lever is moved up from block to block on the rack, and when the length of pipe is forced into the earth the antifriction-cup and operating mechanism are slipped off the pipe. A second length is immediately screwed onto the first length by an ordinary sleeve-coupling, such as is shown in Fig. 3. The operating mechanism is then slipped upon the second length, the antifriction-cup placed upon the end of said second length, and this in turn forced in, as was the first.

The device is also intended to be used in running service-pipes from the basements or cellars of buildings out to the main pipe, in which case the rack may be laid upon the floor. The depressions $k$ in the lever K furnish means of adjustment for the height at which the pipe may be run or the angle of inclination at which the latter may be run.

In operation the device is extremely satisfactory. Apparently what happens is that the auger loosens the earth, which is then tightly packed into a more or less hard tube by the tapered portion. The tube thus formed of the packed earth is slightly larger than the pipe and is of approximately the diameter of the sleeves which connect the lengths of pipe together. The result is that after the auger has been forced in there is little or no additional friction for extra lengths of pipe. It is therefore as easy to force sixty or a hundred feet of pipe through the solid earth as it is to force a foot. In ordinary soil it is possible with this device to run pipe at the rate of about two feet a minute for any ordinary distance, and the course of the end of the pipe can be followed from above by tapping on the end of the pipe which is being inserted. The sound will be transmitted and can be heard at a distance of about fifty or sixty feet from the place of the entrance of the pipe, so that a small shaft can be dug which will exactly meet the forward end of the pipe.

I realize that considerable variation can be made in the details of this construction, and I do not, therefore, desire to limit myself to the specific form herein described.

I claim as new and desire to secure by Letters Patent—

1. The combination with a pipe to be run, of means on one end of the pipe for loosening the earth as the pipe is advanced, a device for subsequently packing the earth to form a tube of larger diameter than the pipe, means for forcing the pipe forward, a sleeve surrounding said pipe, a sprocket rotatable on said sleeve and non-rotatably secured to said pipe, a supporting-arm extending at right angles to said sleeve, a shaft journaled in said supporting-arm, a sprocket upon said shaft, and a sprocket-chain connecting said two sprockets together, whereby the rotation of said shaft will rotate said pipe.

2. The combination with a pipe to be run, of an auger on one end of said pipe, means for forcing said pipe forward, a sleeve surrounding the pipe, a sprocket rotatable on the sleeve, two clamping members secured to the sprocket and mechanism for clamping them upon the pipe, a supporting-arm secured to said sleeve and extending at right angles therefrom, a shaft journaled transverse to said supporting-arm and parallel to said sleeve, a second sprocket on said shaft, and a chain connecting said sprockets together, substantially as described.

3. The combination with a pipe to be run, an auger on one end of the pipe adapted to loosen the earth and means for rotating the pipe, of a member adapted to bring pressure to bear upon the rear end of said pipe, and an antifriction-cup adapted to be secured to the end of said pipe.

4. The combination with a pipe to be run, an auger on one end of the pipe adapted to loosen the earth, and means for rotating the pipe, of a member adapted to bring pressure to bear upon the rear end of said pipe, a cone adapted to be placed upon the rear end of the pipe, a cup provided with a race for balls adapted to come into contact with said pressure member, and suitable antifriction-balls between said cone and said cup.

5. The combination with a pipe to be run, an auger on one end of the pipe adapted to loosen the earth and means for rotating the pipe, of a member adapted to bring pressure to bear upon the rear end of said pipe, a cone provided with a pin adapted to enter the rear end of said pipe, a cup provided with a ball-race adapted to engage with said pressure member, and suitable balls between said cone and the ball-race of said cup.

6. The combination with a pipe to be run, an auger on one end of the pipe adapted to loosen the earth and means for rotating the pipe, of a member adapted to bring pressure to bear upon the rear end of said pipe, a cone provided with a pin adapted to enter the rear end of said pipe, a cup provided with a suitable ball-race adapted to engage said pressure member, a sleeve of less diameter than said cup adapted to hold said cone in place and a plurality of antifriction-balls between said cone and the ball-race of said cup.

In witness whereof I have signed the above application for Letters Patent, at Lanark, in the county of Carroll and State of Illinois, this 3d day of March, A. D. 1903.

ORVILLE E. BROWN.

Witnesses:
BENJAMIN F. BROWN,
GEORGE C. TABER.